US008521524B2

(12) United States Patent
Bates et al.

(10) Patent No.: US 8,521,524 B2
(45) Date of Patent: Aug. 27, 2013

(54) AUTOMATED DETECTION OF SPOKEN NUMBERS IN VOICE MESSAGES

(75) Inventors: Cary Lee Bates, Rochester, MN (US); Paul Reuben Day, Rochester, MN (US); John Matthew Santosuosso, Rochester, MN (US)

(73) Assignee: Nuance Communications, Inc., Burlington, MA (US)

( * ) Notice: Subject to any disclaimer, the term of this patent is extended or adjusted under 35 U.S.C. 154(b) by 872 days.

(21) Appl. No.: 12/099,397

(22) Filed: Apr. 8, 2008

(65) Prior Publication Data

US 2008/0187111 A1    Aug. 7, 2008

Related U.S. Application Data

(63) Continuation of application No. 09/491,902, filed on Jan. 27, 2000, now Pat. No. 7,386,452.

(51) Int. Cl.
*G01L 15/00*    (2006.01)

(52) U.S. Cl.
USPC .......................... 704/235; 704/251; 379/88.03

(58) Field of Classification Search
USPC ............................... 704/235, 251; 379/88.03
See application file for complete search history.

(56) References Cited

U.S. PATENT DOCUMENTS

| 5,500,919 | A | | 3/1996 | Luther | |
|---|---|---|---|---|---|
| 5,504,805 | A | * | 4/1996 | Lee | 379/88.03 |
| 5,651,056 | A | * | 7/1997 | Eting et al. | 379/88.01 |
| 5,671,269 | A | | 9/1997 | Egan et al. | |
| 5,850,629 | A | | 12/1998 | Holm et al. | |
| 5,966,652 | A | * | 10/1999 | Coad et al. | 455/412.1 |
| 6,073,103 | A | | 6/2000 | Dunn et al. | |
| 6,249,765 | B1 | * | 6/2001 | Adler et al. | 704/500 |

* cited by examiner

*Primary Examiner* — Daniel D Abebe
(74) *Attorney, Agent, or Firm* — Wolf, Greenfield & Sacks, P.C.

(57) ABSTRACT

An apparatus, program product and method utilize voice recognition to process voice messages in an automated manner to detect spoken numbers contained therein. Detected spoken numbers can then be analyzed to automatically determine whether such numbers are telephone numbers, and thus enable such numbers to be automatically dialed.

14 Claims, 6 Drawing Sheets

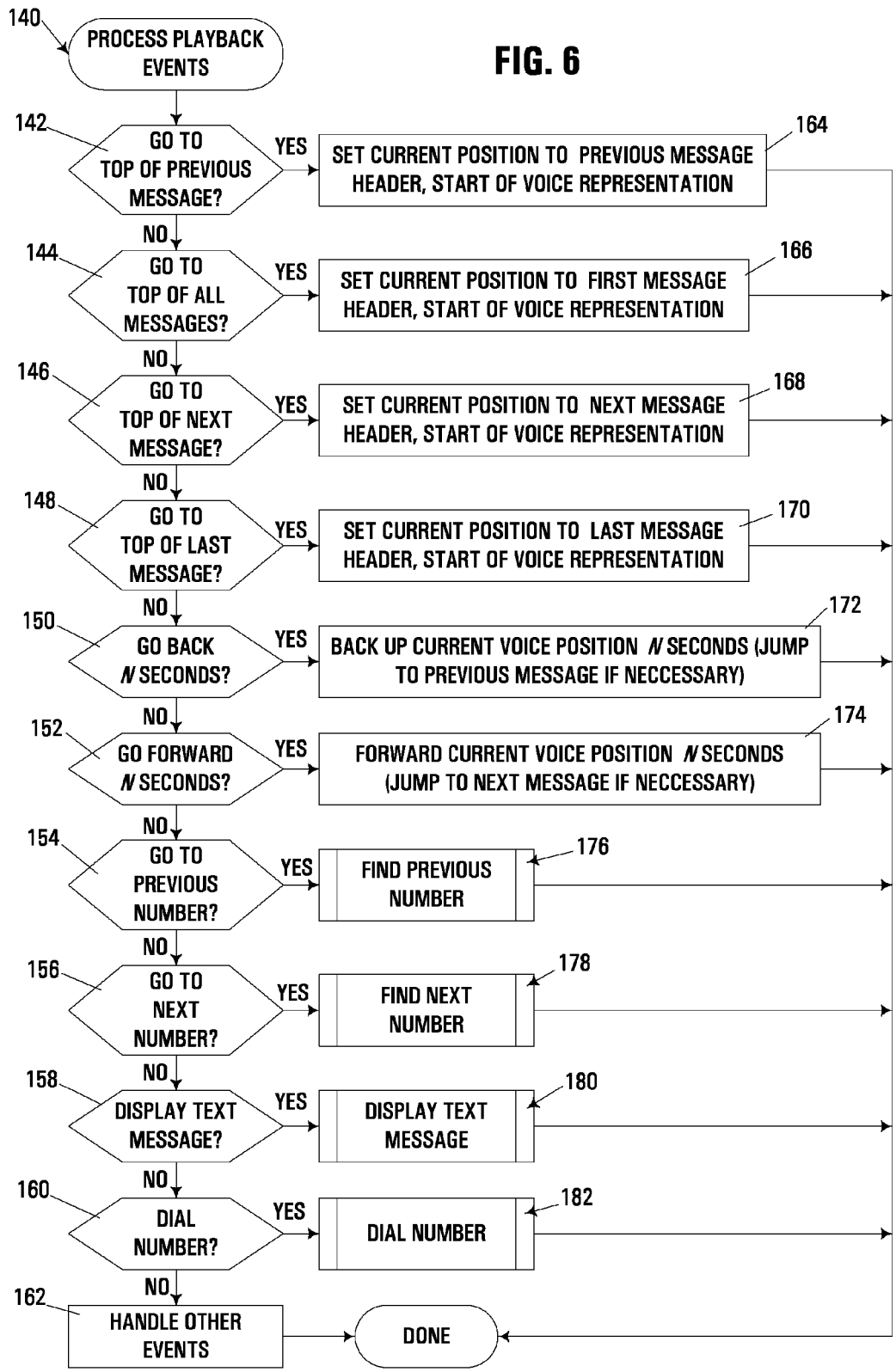

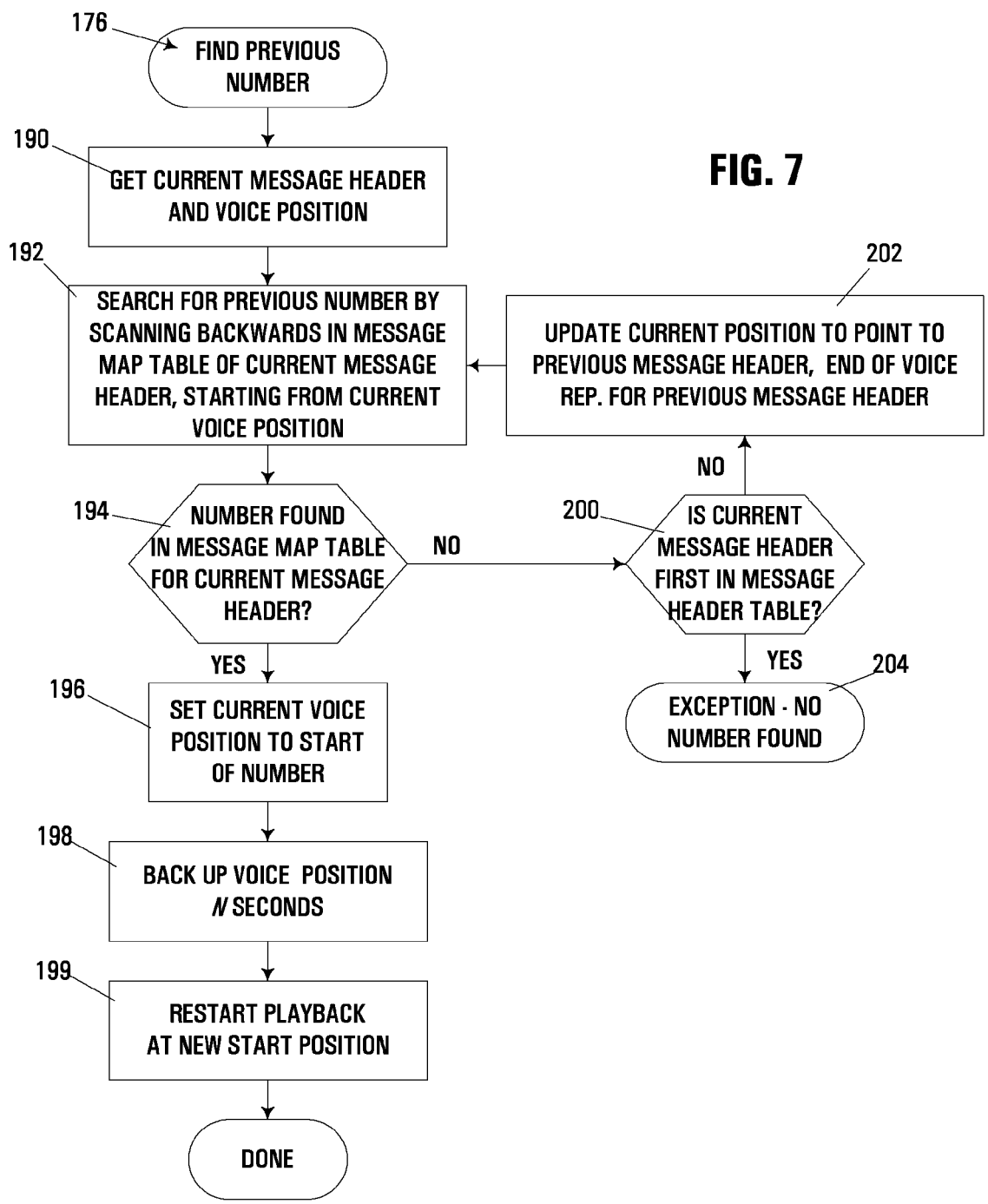

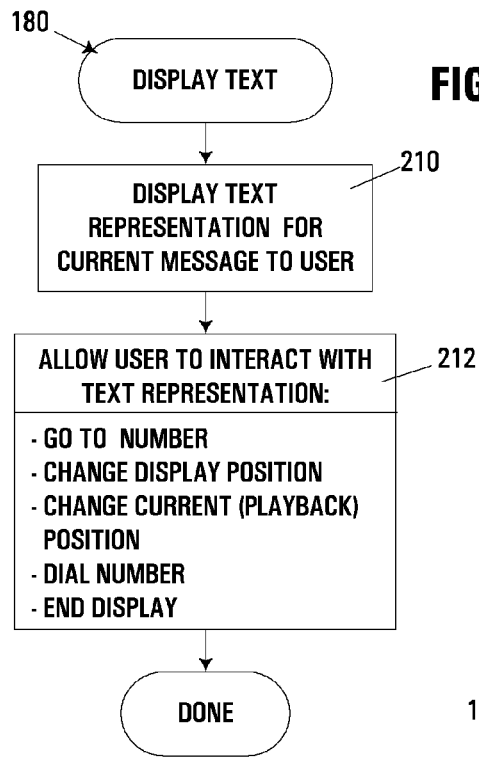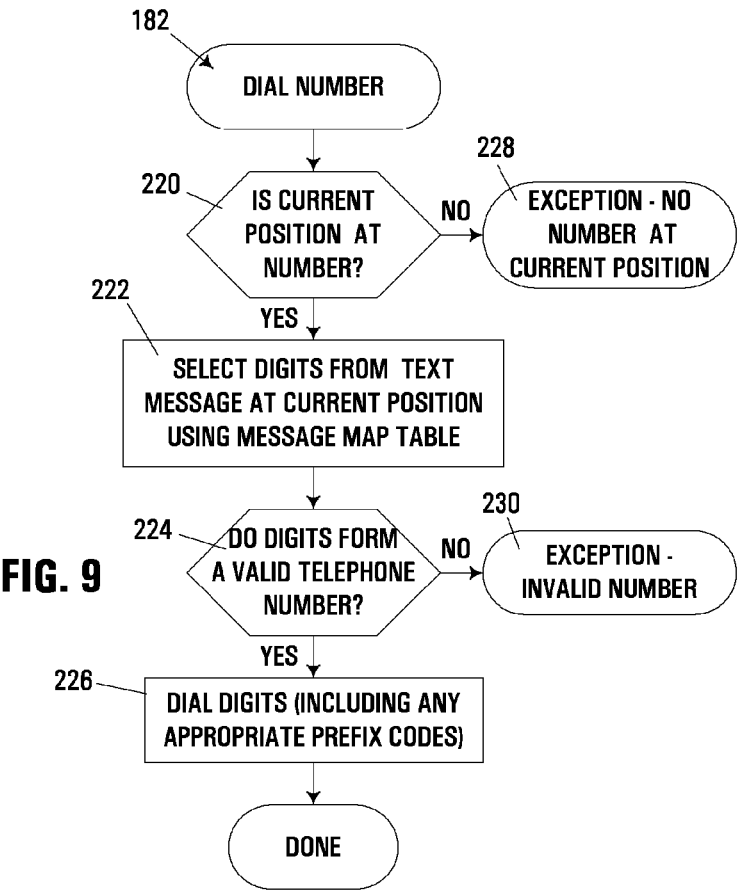

AUTOMATED DETECTION OF SPOKEN NUMBERS IN VOICE MESSAGES

CROSS-REFERENCE TO RELATED APPLICATIONS

This application is a continuation of U.S. patent application Ser. No. 09/491,902, filed on Jan. 27, 2000, by Cary Lee Bates et al. In addition, this application is related to U.S. patent application Ser. No. 12/099,392, filed on even date herewith by Cary Lee Bates et al., which is also a continuation of the aforementioned '902 application. The entire disclosures of both applications are incorporated by reference herein.

FIELD OF THE INVENTION

The invention is generally related to voice messaging and voice recognition technology.

BACKGROUND OF THE INVENTION

Voice messaging, e.g., using answering machines, integrated telephone/answering machines, private voice mail systems and public/telecom voice mail systems, is one of the most prevalent tools for conducting personal and business communications. While different voice messaging systems have a wide variety of different features and capabilities, all voice messaging systems at their most basic level support (1) the ability for a sender to create and send a voice or audio message to one or more intended recipients, and (2) the ability for a recipient to playback a voice message destined for that recipient.

During the playback of a voice message, a recipient is often able to perform a number of different actions on the message, including fast forwarding or rewinding the message to listen to different points in the message, skipping to earlier or later messages, deleting the message, saving the message, forwarding the message to another user, or replying to the message, among other activities. Often, when a voice messaging system is accessed via a telephone, such activities are performed by depressing specific keys on the telephone keypad while the user is listening to a message.

Often, whenever a person leaves a voice message for someone, he or she will provide a telephone number that the sender of the message would like the recipient to call. Retrieval of a telephone number from a voice message, however, can be problematic in some instances.

In particular, rarely is a recipient ready to write down a telephone number in a voice message the first time the recipient listens to the message. It is common, for example, for many users to listen to a message a first time, and once the message is complete, replay the message in its entirety so that the recipient can transcribe the number spoken in the message. In many instances, however, a voice message may be fairly long, and it can take a significant amount of time to replay the portion of the message containing the desired number. In addition, if the message is garbled or otherwise difficult to hear, a recipient may be required to replay a message several times to make sure that the correct number was transcribed.

Rather than requiring recipients to replay entire messages, some voice messaging systems also support fast forward and rewind functions whereby a recipient is able to skip forward or back by a fixed time interval. Typically, the fast forward and rewind functions are initiated in response to depression of a key on a telephone keypad, and skipping forward or backward in fixed time increments can require several depressions of the keypad to locate the desired location in the voice message. If the keypad is disposed on a telephone headset, a recipient is further inconvenienced due to the fact that the user has to alternately depress a key and listen to the handset to locate the appropriate location in the voice message.

In addition, often a recipient of a voice message will want to immediately dial the number spoken in the message. This often requires that the recipient either memorize or write down the number before disconnecting from the voice messaging system and dialing the number. As a result, dialing the number can be somewhat cumbersome to many users of a voice messaging system.

Some telephones and voice messaging systems may also have at their disposal the telephone number of the person that left the message, e.g., through the use of Caller ID technology or simply due to the fact that the sender has a voice mail box on the same system. While many Caller ID-enabled telephones permit a user to dial a number of a person that called the phone, this capability is of no use should a person desire to call a telephone number mentioned in a message that was not the telephone number of the telephone used to make the call.

Therefore, a significant need exists in the art for a manner of facilitating the retrieval of spoken numbers from a voice message.

SUMMARY OF THE INVENTION

The invention addresses these and other problems associated with the prior art by providing an apparatus, program product and method in which voice recognition is performed on voice messages in an automated manner to detect spoken numbers contained therein.

Specifically, consistent with one aspect of the invention, automated number detection is used to automatically dial a detected spoken number. Voice recognition is performed on at least a portion of a voice message to detect a spoken number in the voice message, an automatic determination is made that the spoken number is a telephone number, and the detected spoken number is automatically dialed.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 6 is a flowchart illustrating the program flow of a process playback events routine executed by the voice messaging system of FIG. 2.

FIG. 7 is a flowchart illustrating the program flow of the find previous number routine referenced in FIG. 6.

FIG. 8 is a flowchart illustrating the program flow of the display text routine referenced in FIG. 6.

FIG. 9 is a flowchart illustrating the program flow of the dial number routine referenced in FIG. 6.

DETAILED DESCRIPTION

Hardware and Software Environment

Figure 1:
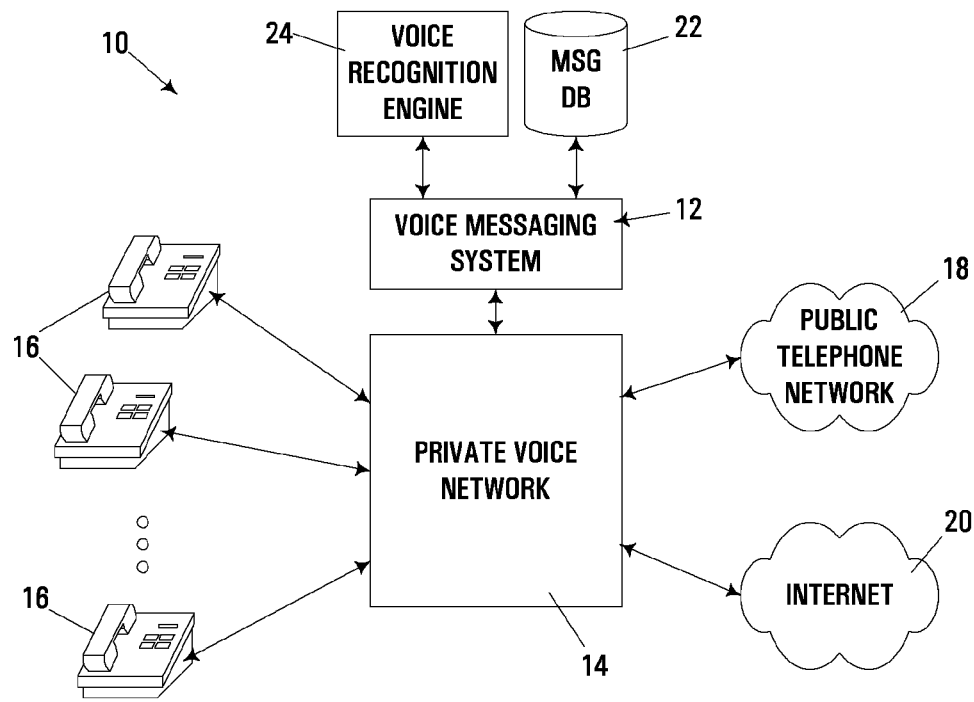
FIG. 1 is a block diagram of a communications system consistent with the invention.

Turning to the Drawings, wherein like numbers denote like parts throughout the several views, FIG. 1 illustrates a communications system 10 incorporating a voice messaging system 12 consistent with the invention. Communications system 10 is illustrated as incorporating a private voice network 14 used to couple a plurality of telephones 16 to one another, as well as to a public network 18 (e.g., local, wireless and/or long distance telephone networks). Private voice network 14 may incorporate various telecommunications functionality, e.g., PBX, as well as video and other multimedia communications capabilities, call center functionality, integrated data communications capabilities, etc. For example, network 14 may be coupled to the Internet or another public data transmission network (represented at 20), e.g., to communicate voice or other information across over such public networks.

Voice messaging system 12 is illustrated as interfacing with network 14 to provide voice messaging capability thereto. As a component of such capability, voice messaging system 12 incorporates automated number detection consistent with the invention. To this extent, voice messaging system 12 is illustrated as interfacing with a message database 22 suitable for storing voice, text and other data related to automated number detection, and with a voice recognition engine 24.

While voice messaging system 12 is shown as a separate system that interfaces with private voice network 14, in the alternative, voice messaging system 12 may be integrated directly into private voice network 14. In addition, in other environments voice messaging system 12 may be incorporated into a public network, e.g., as part of voice messaging services supplied by a telecom provider. Also, in other environments, voice messaging system 12 may be integrated into a separate stand-alone component such as an answering machine or a telephone incorporating voice messaging functionality. It will therefore be appreciated that the environment of FIG. 1 is shown merely for illustrative purposes, and that automated number detection can be implemented into practically any data processing environment in which it is desirable to detect spoken numbers in a voice message.

Figure 2:
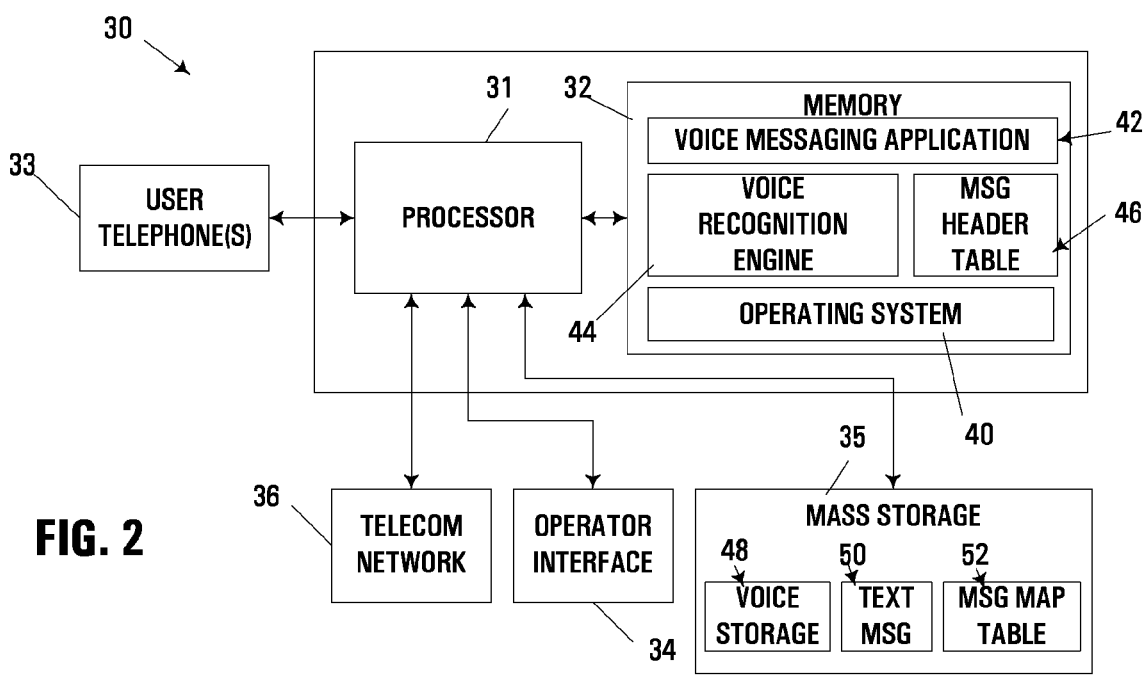
FIG. 2 is a block diagram of an exemplary hardware and software environment for a voice messaging system in the communications system of FIG. 1.

FIG. 2 illustrates in another way an exemplary hardware and software environment for an apparatus 30 incorporating automated number detection consistent with the invention. For the purposes of the invention, apparatus 30 may represent practically any type of computer, computer system, telephone, answering machine or other programmable electronic device incorporating voice communications capabilities.

Apparatus 30 typically includes at least one processor 31 coupled to a memory 32. Processor 31 may represent one or more processors (e.g., microprocessors), and memory 32 may represent the random access memory (RAM) devices comprising the main storage of the apparatus, as well as any supplemental levels of memory, e.g., cache memories, non-volatile or backup memories (e.g., programmable or flash memories), read-only memories, etc. In addition, memory 32 may be considered to include memory storage physically located elsewhere in apparatus 30, e.g., any cache memory in a processor 31, as well as any storage capacity used as a virtual memory, e.g., as stored on a mass storage device 35 or on another data processing system coupled to apparatus 30 via an external network (e.g., telephone network 36).

Apparatus 30 also typically receives a number of inputs and outputs for communicating information externally. For interaction with one or more end users, apparatus 30 typically interfaces with one or more user telephones 33. In addition, for multi-user systems, apparatus 30 may have a supplemental operator interface 34 to enable configuration, programming, and maintenance operations to be performed on the apparatus. For additional storage, apparatus 30 may also include one or more mass storage devices 35, e.g., a floppy or other removable disk drive, a hard disk drive, a direct access storage device (DASD), an optical drive (e.g., a CD drive, a DVD drive, etc.), and/or a tape drive, among others. Furthermore, apparatus 30 is typically interfaced with an external telecommunications network 36. It should be appreciated that apparatus 30 typically includes suitable analog and/or digital interfaces between processor 31 and each of components 32, 33, 34, 35 and 36 as is well known in the art.

Apparatus 30 operates under the control of an operating system 40, and executes or otherwise relies upon various computer software applications, components, programs, objects, modules, data structures, etc. (e.g., voice messaging application 42, voice recognition engine 44, message header table 46, voice storage 48, text messages 50 and message map tables 52, among others). Moreover, various applications, components, programs, objects, modules, etc. may also execute on one or more processors in another computer coupled to apparatus 30 via an external network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and data processing systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Automated Number Detection

Figure 3:
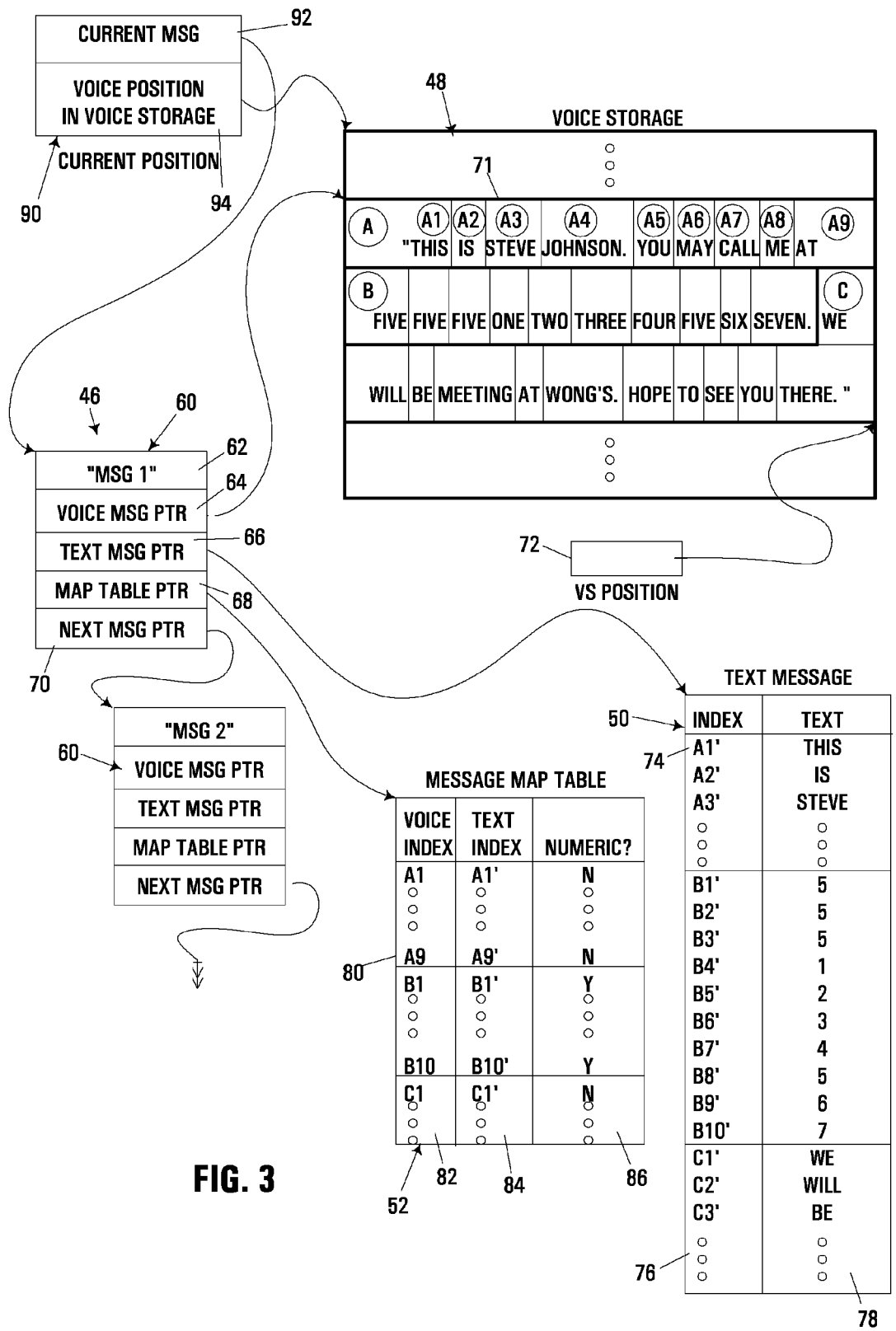
FIG. 3 is a block diagram of various data structures utilized by the voice messaging system of FIG. 2.

The embodiments described hereinafter generally incorporate automated number detection in a voice messaging system to assist users of the system in locating and using spoken numbers contained within voice messages. To implement this functionality, a number of data structures are utilized. One implementation of such data structures is illustrated in FIG. 3. As shown in this figure, a message header table 46 incorporates a plurality of message header records 60 arranged into a linked list, with each record including a plurality of fields 62-70 used to store the necessary information for a particular voice message. Each message header provides a set of pointers linking a voice representation of a voice message, a text representation of the same, and a map table to one another. Specifically, field 62 includes a message identifier from which each message header can be uniquely identified. Field 64 provides a pointer in a voice storage 48 to the start of an audio clip or file 71 functioning as the voice representation of the voice message. A separate voice storage position variable 72 is utilized to point to the end of a last (most recently stored) audio file in voice storage 48. Variable 72 in particular is utilized to point to a position in the voice storage to which new messages should be added.

Returning to message header 60, a text message pointer 66 points to a text message record 50 providing a textual representation of the voice message. Record 50 is illustrated as a two column table including a plurality of entries 74, each having an index field 76 and a text field 78. Each entry 74 identifies a separate word or phrase in the voice message, with the index field providing a unique index therefor.

Returning to message header 60, field 68 provides a pointer to a message map table 52 having a plurality of entries 80, each including a voice index field 82, a text index field 84 and a numeric indicator 86. Voice index field 82 for each entry identifies the position in voice storage 48 of the start of a word or phrase in the voice representation of the voice message. Text index field 84 likewise identifies the index for the same word or phrase in text message record 50. Numeric indicator field 86 identifies whether or not the word or phrase represents a number.

Returning once again to message header 60, field 70 includes the next message pointer that points to a next message header in the linked list 46. The last message header includes a null value in field 70.

Another data structure utilized by a voice messaging system is that of a current position variable 90. Variable 90 includes two fields, a current message field 92 that points to a message header for a current message being processed by the voice messaging system, and a voice position field 94 that stores a current position in the voice representation of the current message in the voice storage. It will be appreciated that during playback, the voice position field is continuously updated as a voice representation is being output to the user, so that the voice position is consistent with the position in the audio clip to that listened to by a user.

To illustrate the interaction between the various data structures utilized in apparatus 30, an exemplary voice message is shown in FIG. 3, containing the message:

"This is Steve Johnson. You may call me at 555-123-4567. We will be meeting at Wong's. Hope to see you there."
A voice or audio representation of the exemplary voice message is shown stored in voice storage 48 in an audio file 71. For ease of understanding, the message is partitioned into three segments, designated A, B and C, with region B including a spoken number, and regions A and C containing other information. The individual words within each region are separately identified using numerical designations, such that the individual words in region A are identified at A1-A9. Each text message record 50 utilizes separate indices for each text word in the textual representation of the voice message, with the text indices denoted with a prime designation.

As such, it may be seen that each entry 80 within message map table 52 maps a voice index to a text index for each word in the spoken message. In addition, for each such word, a numeric indicator is provided to indicate whether the word represents a spoken number or digit thereof. Consequently, for the words within region B, the numeric indicator for each associated map table entry is set, while those for the words in regions A and C, are not set.

It should be noted that the designations herein of the different regions and words within each of these regions are made merely for the purposes of illustration. The index values used to identify specific points in the voice and textual representations of the voice message can take any number of forms consistent with the invention. Moreover, alternate data structures may be utilized for each of voice storage 48, text message record 50, message map table 52 and message header table 46 consistent with the invention. For example, regions of numeric and non-numeric information may be separately identified, without specific index values utilized for each word contained therein. Moreover, rather than utilizing a unified voice storage, separate voice records may be utilized to store the various voice representations of the voice messages. Likewise, any of the textual and mapping information may be combined into a unified storage as desired. Further, no separate index field need be provided in text message record 50, and the functionality of record 50 and map table 52 may be combined into a single data structure if desired. Other modifications will be apparent to those of ordinary skill in the art.

Figure 4:
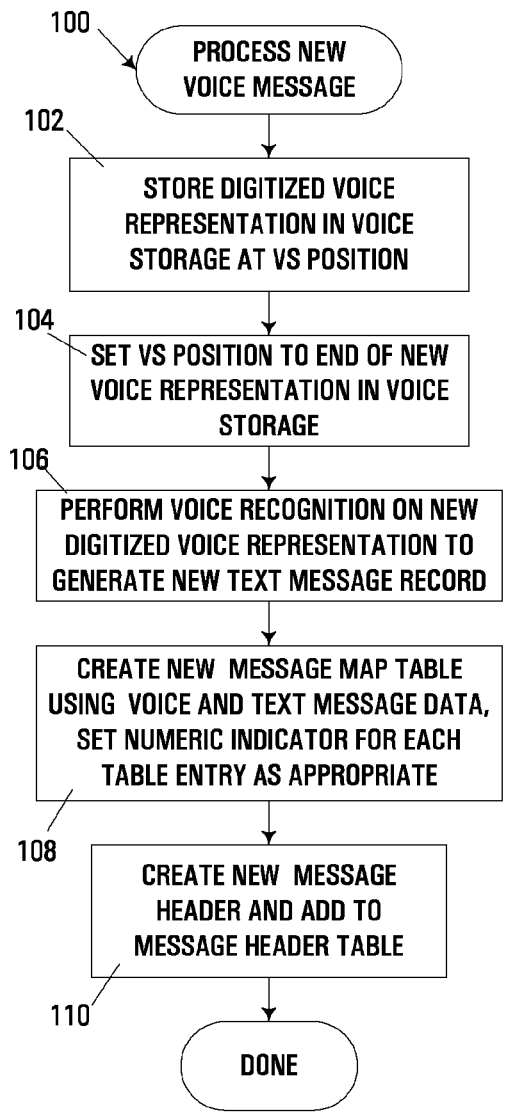
FIG. 4 is a flowchart illustrating the program flow of a process new voice message routine executed by the voice messaging system of FIG. 2.
Figure 5:
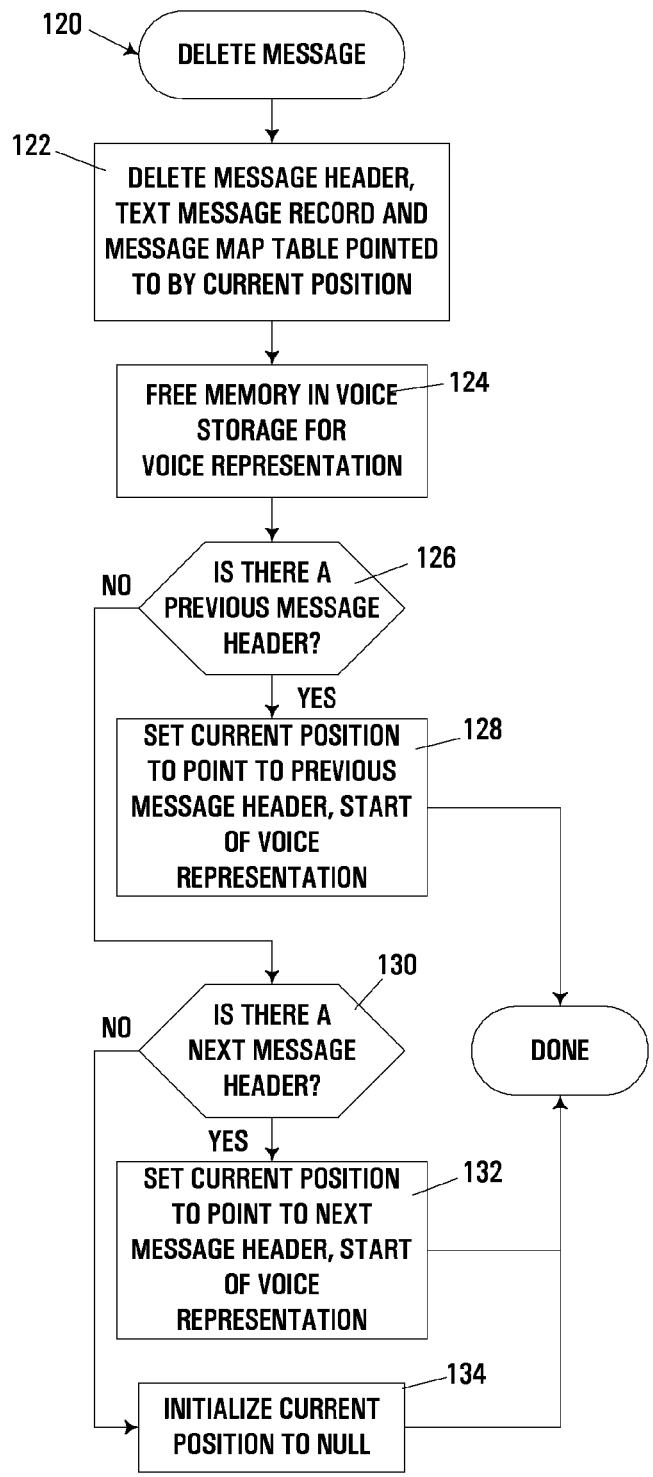
FIG. 5 is a flowchart illustrating the program flow of a delete message routine executed by the voice messaging system of FIG. 2.

To implement automated number detection in a voice messaging system, a number of computer operations may be supported, e.g., within voice messaging application 42 in apparatus 30. FIGS. 4 and 5, for example, illustrate the operations that occur in processing new voice messages and deleting existing voice messages. Moreover, FIGS. 6-9 illustrate the operations that may be performed during playback of a voice message to a recipient. It will be appreciated that the general operation of a voice messaging system in processing new voice messages, deleting existing messages, and handling the playback of a voice message and user input received during such playback are all operations that are well known in the voice messaging art. As such, the discussion hereinafter will focus on the enhancements to these operations to support automated number detection consistent with the invention. Additional functionality supported by known voice messaging systems may also be incorporated into a voice messaging system consistent with the invention; however, a separate discussion of such additional functionality need not be provided herein.

FIG. 4 illustrates a process new voice message routine 100 that is called by voice messaging application 42 responsive to receipt of a new voice message. Routine 100 begins in block 102 by storing a digitized voice representation of the message in the voice storage (VS) at the current voice storage position pointed to by variable 72 (FIG. 3). Typically, such storage occurs after the last voice message stored in the voice storage. In some instances, however, voice messages may be removed from storage, or the total amount of storage may be full, whereby the voice storage position may point to another position within the voice storage.

Next, in block 104, the voice storage position variable 72 is set to point to the end of the new voice representation that has been stored in the voice storage. As such, future voice files added for the user will be stored beginning at the end of the voice representation stored during this iteration of routine 100.

Next, in block 106, voice recognition is performed on the new digitized voice representation using voice recognition engine 44 to generate a text representation of the message for storage in a new text message record. In performing voice recognition, any number of commercial or proprietary voice recognition engine designs and algorithms may be utilized, e.g., the Via Voice voice recognition engine available from International Business Machines Corporation, the Naturally Speaking voice recognition engine available from Dragon Systems, Inc., and others. It will be appreciated that the operations associated with performing voice recognition to generate a text string from a voice file are well known in the art, and thus need not be discussed in further detail herein.

The text string output by the voice recognition engine is subsequently processed to generate a text message record 50, having the format shown in FIG. 3. Specifically, each word in the text string is parsed and placed into a separate entry, with a unique index value associated with each such word. In the alternative, multiple words may be coupled into phrases if desired.

Next, in block 108, a new message map table is created using the voice and text message data, to generate a table having the format shown in FIG. 3. Specifically, the start locations of each word in the voice representations of the message are mapped to the index values within the text message record such that either of the index values for the voice or text representations of the message can be utilized to generate the location of the corresponding word in the other representation.

In addition, in block 108, the numeric indicator is set for each map table entry as appropriate. Typically, this is performed by processing text message record 50 to identify any words within the text message that correspond to numeric formats. For example, a simple string search may be utilized to search for specific numeric strings. In addition, in some implementations the voice recognition engine may directly generate a numeric value as the text representation of a spoken number. It should also be appreciated that either the voice recognition engine or the logic in block 108 may also be configured to handle known variations on spoken numbers, e.g., so that the phrase "fifty-three-hundred" will be translated to the digits "5300". It should also be appreciated that determining the numeric status of a particular word within a text string is well within the abilities of one of ordinary skill in the art having the benefit of the instant disclosure.

Next, once a new message map table has been created, a new message header is created in block 110, and added to the message header table. Typically, this is performed by allocating new storage for the message header, storing the pointers to the location in voice storage, the text message and the message map table associated with the message, adding a new identifier that uniquely identifies the message header, and then storing a pointer to the new message header in field 70 of the former last message header in the linked list. Once the new message header has been added to the message header table, routine 100 is complete.

FIG. 5 next illustrates a delete message routine 120 that is called in response to a user request to delete a message from the system (or alternatively if the message is automatically deleted after a certain time frame). Such a routine may be called, for example, during playback of a message, or after playback of a message is complete.

Routine 120 begins in block 122 by deleting the message header, text message record and message map table pointed to by the current position variable 90 (FIG. 3). As a component of deleting the message header, the next message pointer for the previous message header record (if any) in the table is updated as appropriate. Also, if the deleted message record was first in the list, the pointer to the head of the list is updated.

Next, in block 124, the memory in the voice storage associated with the voice message is freed, or de-allocated. Next, beginning in block 126, the current position variable is updated to point to the start of another message header in the table. In block 126, it is determined whether another message header is prior to the deleted message header in the message header table. If so, control passes to block 128 to set the current position variable to point to the previous message header in field 92, as well as to store the starting location of the voice representation therefor in field 94 (which is stored in field 64 of such message header). Routine 120 is then complete.

If there is no previous message header, control passes from block 126 to block 130 to determine whether a next message header is present in the table. If so, control passes to block 132 to set the current position variable 90 to point to the next message header in the table in field 92. In addition, field 94 of the current position variable is updated to point to the start of the voice representation for the message, stored in field 64 of the next message header. Routine 120 is then complete.

Returning to block 130, if there is no next message header, control passes to block 134 to initialize the current position to null, as no message headers remain in table 46.

FIG. 6 next illustrates a process playback events routine 140 that is utilized to process any user input that occurs during or after playback of a particular voice message. A number of events are detected in blocks 142-160, and handled in the manner discussed below. Additional events, which are not relevant to an understanding of the invention, may also be processed in block 162. Routine 140 is typically called in response to receipt of user input that generates an event during playback of a voice message, or alternatively, after playback of a voice message is complete. The functionality of the various events processed by routine 140 may also be implemented in other areas of the voice messaging system. Moreover, programming models other than an event-driven model may be used in the alternative.

One event that may be handled by routine 140 is a go to top of previous message event, which is detected in block 142 and handled in block 164 by setting the current position variable to point to the previous message header, with field 94 thereof pointing to the start of the voice representation retrieved from field 64 of such message header (FIG. 3). It should be appreciated that if the current message is the first message in the voice storage, an exception may be signaled to notify the user that the first message is currently being processed.

Another event that may be handled in routine 140 is a go to top of all messages event, which is detected in block 144 and handled in block 166 by setting the current position to point to the first message header, as well as to the start of the voice representation associated therewith.

Blocks 146 and 148 respectively detect go to top of next message and go to top of last message events that are respectively handled in blocks 168 and 170 by setting the current position to point to the next (or last) message header, and at the start of the voice representation associated therewith.

Blocks 150 and 152 respectively detect go back n seconds and go forward n seconds events that skip forward or back in the current voice message by a predetermined number of seconds. These events are respectively handled in blocks 172 and 174 to either back up or forward the current voice position (field 94 of current position variable 90) a predetermined number of seconds. Blocks 172 and 174 may also include functionality to jump to a previous or next message if the fast forward or rewind operation spans into another message. In the alternative, a user may be required to specifically request another message rather than skipping directly between messages as disclosed herein.

Block 154 detects a go to previous number event, which is handled by calling a find previous number routine 176, which implements automated number detection consistent with the invention to initiate playback at the immediately preceding spoken number from the current position. Block 156 detects a go to next number event, which calls a find next number routine 178 to perform a complementary operation to automatically detect the position of a next spoken number from the current position.

Block 158 detects a display text message event, which is handled by a display text routine 180. A dial number event is detected in block 160 and handled by a dial number routine 182. The operations associated with handling these latter events will be discussed in greater detail below.

FIG. 7 illustrates find previous number routine 176 in greater detail. Routine 176 begins in block 190 by getting the current message header and voice position from the current position variable 90. Next, block 192 searches for a previous spoken number by scanning backwards in the message map table of the current message header, starting from the entry having a voice index closest to the current voice position. Typically, this is performed by searching through previous table entries to find one or more entries having the numeric indicators set therefor.

In addition, in this block it may be desirable to confirm whether a sequence of entries having numeric indicators set therefor constitutes a likely telephone number. For example, it may be desirable to determine whether a sequence of entries define a number having more than a predetermined number of digits, e.g., to distinguish telephone numbers from other spoken numbers in a message such as "I'll see you at five o'clock". In many instances, it may be desirable to require at least four spoken digits to be detected, so that extension numbers can be detected. In other instances, it may be sufficient to require seven or more spoken digits, particularly if the type of voice communications environment does not support the use of extensions.

Next, in block 194, it is determined whether a spoken number has been found in the message map table for the current message header. If so, the current voice position field in the current position variable is set to the start of the located number in block 196—typically by using the voice index for the first (leading) entry in a sequence of entries having set numeric indicators. Next, in block 198, the voice position is optionally backed up several seconds to provide a contextual framework from which it is easier for the listener to determine whether a telephone number is being conveyed in the message. Next, in block 199, playback may optionally be explicitly restarted at the new voice position. In the alternative, separate input may be required to restart playback, or the playback may be inherently restarted as a result of routine 176. Routine 176 is then complete.

Returning to block 194, if no number is found in the current message header, control passes to block 200 to determine whether the current message header is the first message header in the message header table. If not, control passes to block 202 to update the current position variable to point to the previous message header, with the voice position set to the end of the voice representation associated with such previous message header. Control then returns to block 192 to search backwards in the new message header to locate a spoken number therein. Returning to block 200, if the current message header is the first message header in the table, control passes to block 204 to signal an exception that no number has been found. Then, dedicated exception handling program code can notify the user, for example, that no spoken numbers precede the current position. In the alternative, rather than spanning into previous messages, block 194 may simply pass control to block 204 to signify to the listener that no spoken numbers precede the current position in the current message.

It will be appreciated that find next number routine 178 referenced in FIG. 6 operates in essentially the same manner as routine 176, with the exception that the operation corresponding to block 192 of routine 176 would search forward in the message map table of the current message to locate a spoken number. In addition, in the blocks corresponding to blocks 200 and 202 of routine 176, it would be determined whether a current message header is last in the message header table, and if not, to update the current position to point to the next message header, and to the start of the voice representation associated therewith. In addition, any notification to the user that no number is found may be similarly modified.

FIG. 8 next illustrates a display text routine 180 that may be initiated, for example, in response to a listener's desire to view a text representation of a portion of a message. Routine 180 starts in block 210 by displaying a text representation for the current message to the user. The format of such text representation may vary substantially depending upon the type of display within which the text is displayed. For example, for a telephone-based display, only a limited amount of display space may be provided, and the request to display text may display only a short segment of the message. In addition, only the current spoken number may be displayed, or other text in the message may be displayed as desired. For a computer-based display, e.g., in a text or graphical user interface environment, a greater portion of the text representation may be displayed, with greater user interaction permitted.

Next, in block 212, it may also be desirable to allow a user to interact with a text representation through any number of operations. For example, a user may be permitted to scroll within a text representation to locate a cursor at a specific number or other position in the message. A user may also be permitted to change the current playback position based upon the position of a cursor in the display. A user may also be permitted to dial a number located at a current cursor position. Furthermore, a user may be permitted to end the display of the text through separate user input.

Typically, block 212 will terminate when a user has selected an action that terminates interaction with the text, e.g., a request to end the display, a request to dial a number, or through other actions such as picking up the telephone handset to make a call. Other operations will be apparent to one of ordinary skill in the art.

FIG. 9 next illustrates a dial number routine 182, which may be initiated, for example, in response to a user request through a telephone handset, or through user interaction with displayed text, if desired. Routine 182 begins in block 220 by determining whether the current position is located at a spoken number. Block 220 may be implemented, for example, by detecting whether the current position maps to an entry in the message map table that is within a spoken number. As with block 192 of routine 176, it may also be desirable to determine whether the spoken number corresponds to a valid telephone number, using any of the number of techniques described above in connection with block 192.

Next, if the current position is located at a spoken number, control passes to block 222 to select the digits from the text representation of the current message at the current position using the message map table. Typically, this is implemented by selecting the entry in the message map table corresponding to the current position, finding the first and last entries in the message map table from the current position having set numeric indicators, and then using the text indices in each of the entries to retrieve the corresponding text representations from the text message record.

Next, in block 224, it is determined whether the digits form a valid telephone number. As discussed above, this operation may include determining whether the sequence of digits includes at least a minimum number of digits. Additional functionality may also be incorporated, for example, to determine whether a number of digits equals a number format recognized by the voice communication system, as well as utilizing telephone directory services to determine whether a valid number exists.

If a valid telephone number is detected, block 224 passes control to block 226 to dial the selected digits. Block 226 may be implemented using any number of auto-dialing services supported in most voice communication systems. Moreover, block 226 may incorporate the dialing of prefix codes such as those codes required to initiate an outside line, international or long distance dialing codes, area codes, etc. Once block 226 has dialed the appropriate digits, routing 182 is then complete.

Returning to block 220, if it is determined that the current position is not located at a spoken number, control passes to block 228 to signal an exception and notify the user that no number exists at the current position. Moreover, returning to block 224, if the digits are determined to not form a valid telephone number, an exception is signaled in block 230 to notify the user that the digits do not form a valid telephone number.

Routine 182 may also incorporate additional functionality, such as providing a confirmation capability prior to actually dialing the number. Any number of voice synthesis technologies can be incorporated, for example, to convey to the user the number that was selected, then requiring a user to depress a key on the telephone handset to initiate dialing of the number. Other additional functionality will be apparent to one of ordinary skill in the art having benefit of the instant disclosure.

Various modifications may be made to the illustrated embodiments without departing from the spirit and scope of the invention. For example, rather than positioning the current position at the first digit in a sequence of digits in response to a request to find a spoken number, the current position may be updated to point to another digit in the sequence, including the last. In addition, the text display function may also incorporate additional functionality, such as identifying and scanning for proper names or other specific text in a voice message. In addition, in the dial number routine, it may be desirable to provide user feedback by displaying the text representation of the dialed number to the user, e.g., in a telephone display.

Other modifications will become apparent to one of ordinary skill in the art. Therefore, the invention lies in the claims hereinafter appended.

What is claimed is:

1. A method of processing a voice message, the method comprising:
   performing voice recognition on at least a portion of the voice message to identify a plurality of digits by individually detecting any spoken digits in the voice message, and by detecting an alternative spoken numerical expression different from a spoken digit;
   automatically determining, using a processor, whether the plurality of digits represent a telephone number; and
   automatically dialing the plurality of digits when it is determined the plurality of digits represent a telephone number.

2. The method of claim 1, wherein automatically dialing the plurality of digits is performed in response to user input.

3. The method of claim 1, further comprising:
   displaying the plurality of digits and text representing a segment of the voice message.

4. The method of claim 1, further comprising dialing a prefix prior to dialing the plurality of digits.

5. The method of claim 1, wherein the alternative spoken numerical expression includes a spoken word "hundred."

6. An apparatus, comprising:
   a processor configured to execute a program to perform voice recognition on at least a portion of a voice message to identify a plurality of digits by individually detecting any a spoken digits in the voice message, and by detecting an alternative spoken numerical expression different from a spoken digit. to automatically detect whether the plurality of digits represent a telephone number, and to automatically dial the plurality of digits when it is determined the plurality of digits represent a telephone number.

7. The apparatus of claim 6, wherein the program is configured to automatically dial the plurality of digits in response to user input.

8. The apparatus of claim 6, wherein the processor is further configured to display the plurality of digits and text representing a segment of the voice message.

9. The apparatus of claim 6, wherein the processor is further configured to dial a prefix prior to dialing the plurality of digits.

10. A program product, comprising:
    a program configured to perform voice recognition on at least a portion of a voice message to identify a plurality of digits by individually detecting any spoken digits in the voice message, and by detecting an alternative spoken numerical expression different from a spoken digit, to automatically detect whether the plurality of digits represent a telephone number, and to automatically dial the plurality of digits when it is determined the plurality of digits represent a telephone number; and
    a physical computer readable medium storing the program.

11. The program product of claim 10, wherein the computer readable medium includes a recordable medium.

12. The program product of claim 10, wherein the program is configured to automatically dial the plurality of digits in response to user input.

13. The program product of claim 10, wherein the program is further configured to display the plurality of digits and text representing a segment of the voice message.

14. The program product of claim 10, wherein the program is further configured to dial a prefix prior to dialing the plurality of digits.

\* \* \* \* \*